United States Patent [19]
Olds et al.

[11] Patent Number: 5,574,968
[45] Date of Patent: Nov. 12, 1996

[54] SATELLITE CELLULAR COMMUNICATION METHODS FOR PERFORMING CELL-TO-CELL HANDOFF

[75] Inventors: Keith A. Olds; James P. Redden, both of Mesa, Ariz.; Christopher Kurby, Elmhurst, Ill.

[73] Assignee: Motorola, Inc., Schaumburg, Ill.

[21] Appl. No.: 252,472

[22] Filed: Jun. 1, 1994

[51] Int. Cl.$^6$ .................................................. H04B 7/19
[52] U.S. Cl. ...................... 455/12.1; 455/33.2; 455/56.1; 379/60
[58] Field of Search ................................. 455/12.1, 13.1, 455/13.2, 33.1, 33.2, 33.3, 33.4, 53.1, 54.1, 56.1, 63; 379/60

[56] References Cited

U.S. PATENT DOCUMENTS 5,161,248  11/1992  Bertiger et al. ..................... 455/33.2

OTHER PUBLICATIONS

Moritz, Steve "Handoff Design Consideration for the Iridium System" Nov. 1991.

*Primary Examiner*—Reinhard J. Eisenzopf
*Assistant Examiner*—Thanh Le
*Attorney, Agent, or Firm*—Harold C. McGurk, IV

[57] ABSTRACT

Handoff methods perform cell-to-cell handoff between cells of the same satellite and between cells of different satellites. Handoff is initiated by an individual subscriber unit (ISU) based on local conditions. Once handoff is needed, the ISU chooses a candidate cell to transfer its communication based on a dynamic handoff candidate list provided by the satellite. After selecting a candidate cell, the ISU requests handoff, the satellite or satellites perform the handoff and communication begins over a new channel in the candidate cell.

27 Claims, 5 Drawing Sheets

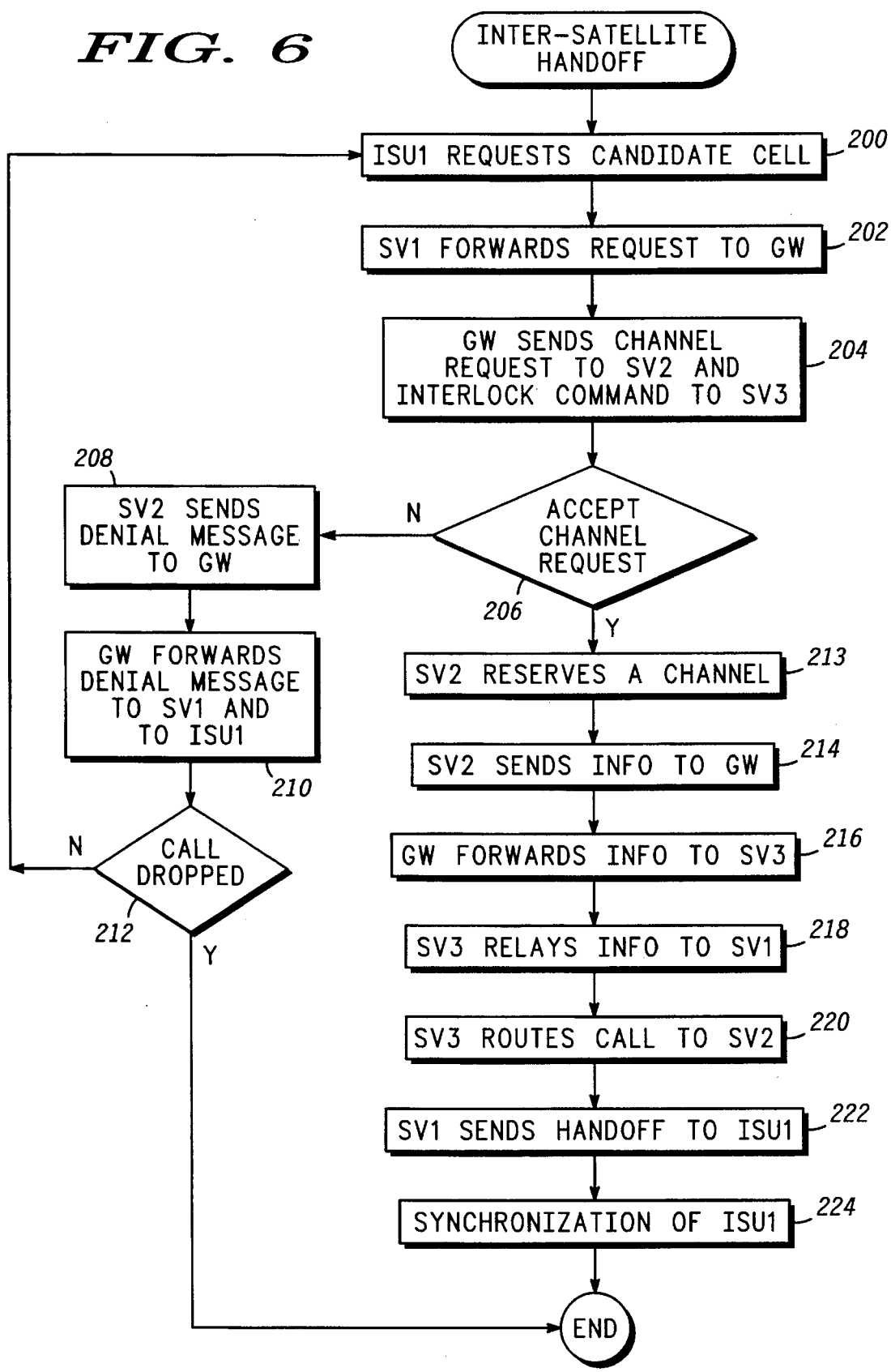

SATELLITE CELLULAR COMMUNICATION METHODS FOR PERFORMING CELL-TO-CELL HANDOFF

The present invention is related to the following invention: "METHOD AND APPARATUS FOR VARYING APPARENT CELL SIZE IN A CELLULAR COMMUNICATION SYSTEM", by James Redden, having Ser. No. 08/240,937, filed on May 2, 1994, and assigned to the assignee of the present invention.

TECHNICAL FIELD

This invention relates generally to satellite cellular communications and, in particular, to methods for performing cell-to-cell handoff between cells of the same satellite and between cells of different satellites.

BACKGROUND OF THE INVENTION

A cellular communication system projects a number of cells onto the Earth at diverse locations. A frequency spectrum is allocated in frequency, time, coding or a combination of these to the cells so that communications occurring in nearby cells use different channels to minimize the chances of interference. Communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results with no interference among the different communications.

One problem which cellular communication systems address is the handing-off of communications between cells. Relative movement between end users and cells causes the end users and the communication links directed thereto to move between cells. To permit continuous communications in an ongoing call, the system must "handoff" the call when the individual subscriber unit crosses a cell boundary. If a call is not handed-off to a new cell upon leaving the old cell, the call will eventually be lost or dropped because the strength of the signals significantly decreases so that the individual subscriber unit cannot receive the unit's transmissions, or visa versa.

The conventional handoff technique may work adequately when the distances between individual subscriber units and system transceivers are relatively small, when the speeds of movement between cells and subscriber units are slow, or when handoffs are relatively evenly distributed in time. Such conditions are present for conventional terrestrial cellular systems in which cells do not move with respect to the Earth and in which subscriber units move between cells according to conventional modes of transportation. On the other hand, when system radio equipment is located on satellites orbiting the Earth at high rates of speed, these conditions are not present and conventional handoff techniques are inadequate.

Some advanced handoff techniques use a predetermined sequence or schedule for determining which channel of what cell to handoff communication. The predetermined schedule for a particular ISU is derived by first providing to a central controller a link with the system and its position on the Earth. Next, the central controller projects the satellite orbital motion against the ISU position to derive a schedule of handoffs for the ISU. Finally, the predetermined schedule of handoffs is sent to the ISU which attempts to execute the handoffs as directed by the schedule.

Scheduled handoffs depends on an accurate location for every subscriber. Generating and maintaining the schedules for all of the ISU's currently active in the network places a major processing burden on gateways in the network. Moreover, the fixed scheduling is susceptible to failures based on instantaneous local conditions or circumstances. Failures can be caused by factors such as fading or subscriber motion. This leads to a large number of error checks and recovery processes.

Accordingly, there is a significant need for a cell hand-off system which permits each of the ISU's to determine when a handoff is necessary and to select a candidate cell that will receive its communications, rather than imposing a single universal handoff process for all ISU's.

BRIEF DESCRIPTION OF THE DRAWINGS

FIG. 6 shows a flowchart of an inter-satellite handoff method in accordance with a preferred embodiment of the invention.

DESCRIPTION OF THE PREFERRED EMBODIMENTS

The present invention has utility in handing-off calls or communication between cells of the same satellite and between cells served by different satellites. Handoff is initiated by an individual subscriber unit (ISU) based on local conditions. Once handoff is needed, the ISU chooses a candidate cell from a dynamic handoff candidate list of available candidate cells. The handoff candidate list is provided to the ISU from the satellite. After selecting the candidate cell, the ISU requests handoff, handoff is performed and communication begins over the new traffic channel in the candidate cell.

A "satellite" means a man-made object or vehicle intended to orbit a celestial body such as the Earth. The term "satellite" is intended to include both geostationary and orbiting satellites and/or combinations thereof including low-earth orbiting (LEO) satellites. The word "Earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular communication systems and/or combinations thereof.

Figure 1:
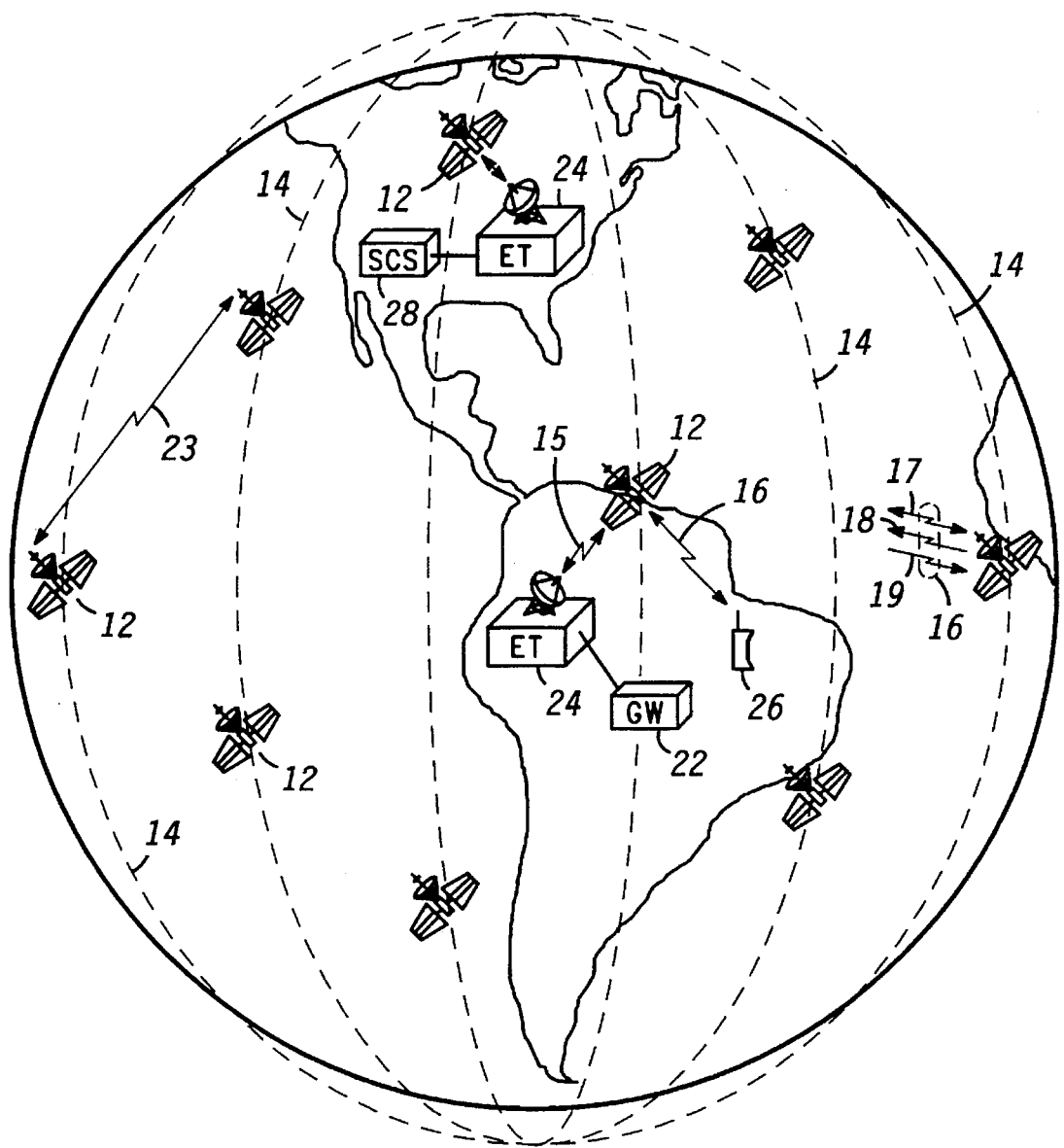
FIG. 1 depicts a highly simplified diagram of a satellite-based communication system of which the present invention may form a portion thereof.

FIG. 1 illustrates a highly simplified diagram of satellite-based communication system 10, dispersed over and surrounding Earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of Earth at any instant. For the example shown, satellites 12 travel with respect to Earth at around 25,000 km/hr, allowing satellite 12 to be visible to a terrestrial station or ISU's 26 for a period of approximately nine minutes.

Satellites 12 communicate with terrestrial stations which may include some number of radio communication individual subscriber units (ISU's) 26 and earth terminals (ET's) 24 connected to system control segment (SCS) 28. ET's 24 may also be connected to gateways (GW's) 22 which provide access to a public switched telephone network (PSTN) or other communications facilities. Only one each of GW's 22, SCS's 28 and ISU's 26 are shown in FIG. 1 for clarity and ease of understanding. ET's 24 may be co-located with or separate from SCS 28 or GW 22. ET's 24 associated with SCS's 28 receive data describing tracking of satellites 12 and relay packets of control information while ET's 24 associated with GW's 22 only relay data packets (e.g., relating to calls in progress).

ISU's 26 may be located anywhere on the surface of the Earth or in the atmosphere above the Earth. ISU's 26 are preferably communications devices capable of transmitting data to and receiving data from satellites 12. By way of example, ISU's 26 may be a hand-held, portable cellular telephones adapted to communicate with satellites 12. Ordinarily, ISU's 26 need not perform any control functions for communication system 10.

Communication system 10 may accommodate any number, potentially in the millions, of ISU's 26. In the preferred embodiments of the present invention, ISU's 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) and/or Code Division Multiple Access (CDMA) communications or combination thereof. At a minimum, satellite 12 regularly transmits over one or more broadcast channels 18. ISU's 26 synchronize to broadcast channels 18 and monitor broadcast channels 18 to detect data messages which may be addressed to them. ISU's 26 may transmit messages to satellites 12 over one or more acquisition channels 19. Broadcast channels 18 and acquisition channels 19 are not dedicated to any one ISU 26 but are shared by all ISU's 26 currently within view of a satellite 12.

On the other hand, traffic channels 17 are two-way channels that are assigned to particular ISU's 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the Earth may be routed through the constellation of satellites 12 to within range of substantially any other point on the surface of the Earth. A communication may be routed down to an ISU 26 on or near the surface of the Earth from a satellite 12 using subscriber link 16. Alternatively, a communication may be routed down to or up from any of many ET's 24, of which FIG. 1 shows only two, through earth links 15. ET's 24 are usually distributed over the surface of the Earth in accordance with geo-political boundaries. In the preferred embodiments, each satellite 12 may communicate with up to four ET's 24 and over a thousand ISU's 26 at any given instant.

SCS 28 monitors the health and status of system communication nodes (e.g., GW's 22, ET's 24 and satellites 12) and desirably manages operations of communication system 10. One or more ET's 24 provide the primary communications interface between SCS 28 and satellites 12. ET's 24 include antennas and RF transceivers and preferably perform telemetry, tracking and control functions for the constellation of satellites 12.

GW's 22 may perform call processing functions in conjunction with satellites 12 or GW's 22 may exclusively handle call processing and allocation of call handling capacity within communication system 10. Diverse terrestrial-based communication systems, such as the PSTN, may access communication system 10 through GW's 22.

With the example constellation of sixty-six satellites 12, at least one of satellites 12 is within view of each point on the Earth's surface at all times, resulting in full coverage of the Earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISU's 26, between SCS 28 and GW 22, between any two GW's 22 or between ISU 26 and GW 22.

The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

Figure 2:
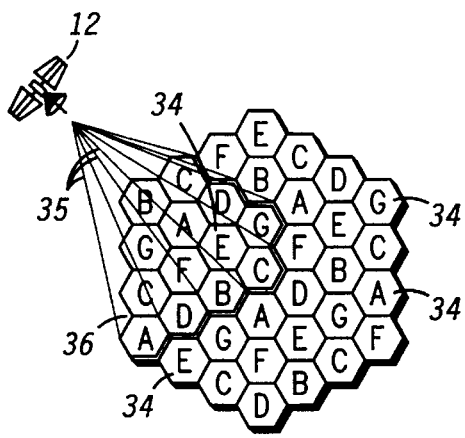
FIG. 2 shows a typical layout diagram of a cellular pattern projected by a satellite onto the Earth.

FIG. 2 shows a typical layout diagram of a cellular antenna pattern projected by satellites 12 onto the surface of the Earth. Each satellite 12 includes an array (not shown) of directional antennas. Each array projects numerous discrete antenna beams 35 or broadcast channel antenna patterns onto the Earth's surface at numerous diverse angles. FIG. 2 shows a diagram of a resulting pattern of cells 34 that satellites 12 form on the surface of the Earth. A footprint region 36, which is bounded by a double line in FIG. 2, results from the antenna beams 35 produced by an antenna array of a single satellite 12. The cells 34 which reside outside of region 36 are produced by antenna arrays from other satellites 12.

Antenna patterns 35 are shown as hexagons for convenience only. Those of skill in the art understand that antenna patterns 35 may be other shapes. For example, in the case where the antenna patterns are transmitted from satellites, some antenna patterns 35 may be more elliptical in shape depending on the angle incident to the surface of the Earth. The particular shape of the antenna pattern is not important for the present invention.

Although not shown in FIG. 2, antenna patterns 35 may overlap. Those of skill in the art will understand that antenna patterns generally represent regions where a signal level (for example, of the broadcast channel) associated with a cell is greater than some predetermined level, and outside that region, the signal level is less than that predetermined level.

As discussed previously, satellite 12 continuously transmit over one or more broadcast channels 18. ISU's 26 synchronize to broadcast channels 18 and monitor broadcast channels 18. Preferably, an ISU continually monitors the broadcast channel of the cell in which it is located. Broadcast channels 18 are not dedicated to any one ISU but are shared by all ISU's currently within view of the satellite.

In the preferred embodiment, broadcast channel antenna patterns move over the surface of the Earth while ISU's remain relatively stationary. In the preferred embodiment, this motion is caused by the motion of the satellites which transmit the broadcast channels. Each antenna pattern 35 or cell 34 is approximately 500–600 miles in diameter and moves across the surface of the Earth at a rate of approximately 110 miles in thirty seconds. The motion of the broadcast channel antenna patterns from the equator to the poles creates overlap of antenna patterns between adjacent satellites. As overlap occurs, broadcast channels are desirably turned off to prevent interference between overlapping antenna patterns.

Assignments of traffic channels 17 (FIG. 1) are valid only for as long as an ISU remains within the cell. Generally, based on the movement of the satellites, this period is approximately 30 seconds. New traffic channel assignments must be established every period. Because of the fast moving antenna patterns, it is desirable for ISU's to monitor the broadcast channels of adjacent cells that are candidates for handoff.

FIG. 2 illustrates an assignment of channel sets to cells 34 in accordance with a division of the spectrum into seven discrete channel sets. The precise number of channel sets into which the spectrum used by satellites 12 is divided is not important to the present invention. FIG. 2 references the seven discrete channel sets through the use of the characters "A", "B", "C", "D", "E", "F", and "G". Those skilled in the art will appreciate that a different number of channel sets, for example twelve, may be used and that, if a different number is used the resulting assignment of channel sets to cells 34 will differ from the assignment pattern depicted in FIG. 2. Likewise, those skilled in the art will appreciate that each channel set may include one channel or any number of orthogonal channels therein. As illustrated in FIG. 2, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another and do not overlap. Moreover, each ISU 26 is capable of operating with any of the discrete channel sets, and the particular channel set used at any particular time by any particular ISU 26 is controlled by communication system 10.

Typically, cellular communication system use various methods to allocate the limited electro-magnetic spectrum available for each cell. In Frequency Division Multiplexing (FDM) or Frequency Division Multiple Access (FDMA) systems, specified sub-bands of frequency are allocated from the communication resource (i.e. the limited electro-magnetic spectrum allocated for use). In a FDM/FDMA cellular communication system, each cell is assigned to one of these groups of frequencies so as to not interfere with adjacent or nearby cells. For example, in a seven frequency reuse scheme as shown in FIG. 2, the frequency assignments are fixed to the seven discrete channel sets noted as characters "A", "B", "C", "D", "E", "F", and "G" as previously described. The seven frequency reuse arrangement of cells helps prevent interference between cells with identical frequency assignments (i.e. co-channel cells) by separating these cells by at least two cells of different frequency assignments although it is more desirable to have only one cell separating co-channel cells.

Cellular communication systems also use Time Division Multiplexing (TDM) or Time Division Multiple Access (TDMA) where there are periodically recurring time slots during which message information of a particular user is transmitted/received. The users are assigned to particular time slots controlled by a master controller synchronized by a master clock. In reference to FIG. 2, each discrete channel set noted as characters "A", "B", "C", "D", "E", "F", and "G" can be assigned one time slot. Each cell can use the same frequency channel or channel set without interference because the users in each cell only receive or transmit information during their assigned time slot. Each time slot can contain one message packet (i.e., single message time slots) or can contain multiple message packets (i.e., multiple sub-time slots each containing a single message).

In some applications, it is desirable to use a combination of FDMA and TDMA. For example, instead of using the same frequency channels or channel sets for a network and allocating different time slots to different cells, it is possible to rotate frequencies among the cells and assign the same or different time slot per cell. With FDMA and TDMA, some frequencies or time slots are usually reserved for access signaling and/or control, and are not ordinarily available for conventional conversations and/or user data transfer (i.e., for access protocol). Some channels and/or time slots of the combination FDMA/TDMA system of a preferred embodiment of the present invention are also desirably reserved for the same purpose. FDMA and TDMA communication techniques and combinations thereof are well known to those of skill in the art.

The communication resource, (i.e. limited electromagnetic spectrum) can also be partitioned Code Division Multiplexing (CDM) or Code Division Multiple Access (CDMA). CDMA is a spread spectrum technique in which specified members of a set of orthogonal or nearly orthogonal spread spectrum codes are allocated, each using the full channel bandwidth. Two common spread spectrum techniques are direct-sequence and frequency hopping. These communication techniques are well known in the art.

Other techniques in the art for allocation of the communication resource include Space Diversity (SD) and Polarization Diversity (PD). In an SD system, spot beam antennas can be used to separate radio signals by pointing in different directions. This also allows for reuse of the same frequency band. In a PD communication system, orthogonal polarizations are used to separate signals also allowing for reuse of the same frequency band. These communication techniques are also well known in the art.

While the specific communication technique (i.e. method of allocating the communication resource) is not important for the present invention, those of skill in the art will understand that any one or combination of the above described communication techniques can be used in the present invention.

ISU's initially determine with which cell to communicate with based on the signal level or signal quality of the broadcast channel received at the ISU. For example, an ISU located within a center region of a cell would most likely choose to communicate within the cell associated with this cell because the broadcast channel signal level of an antenna pattern is generally the greatest in the center region. If a subscriber unit is located within the region where two antenna patterns or cells overlap, the ISU may choose either cell to communicate with because the broadcast channel signal levels are generally similar.

Figure 3:
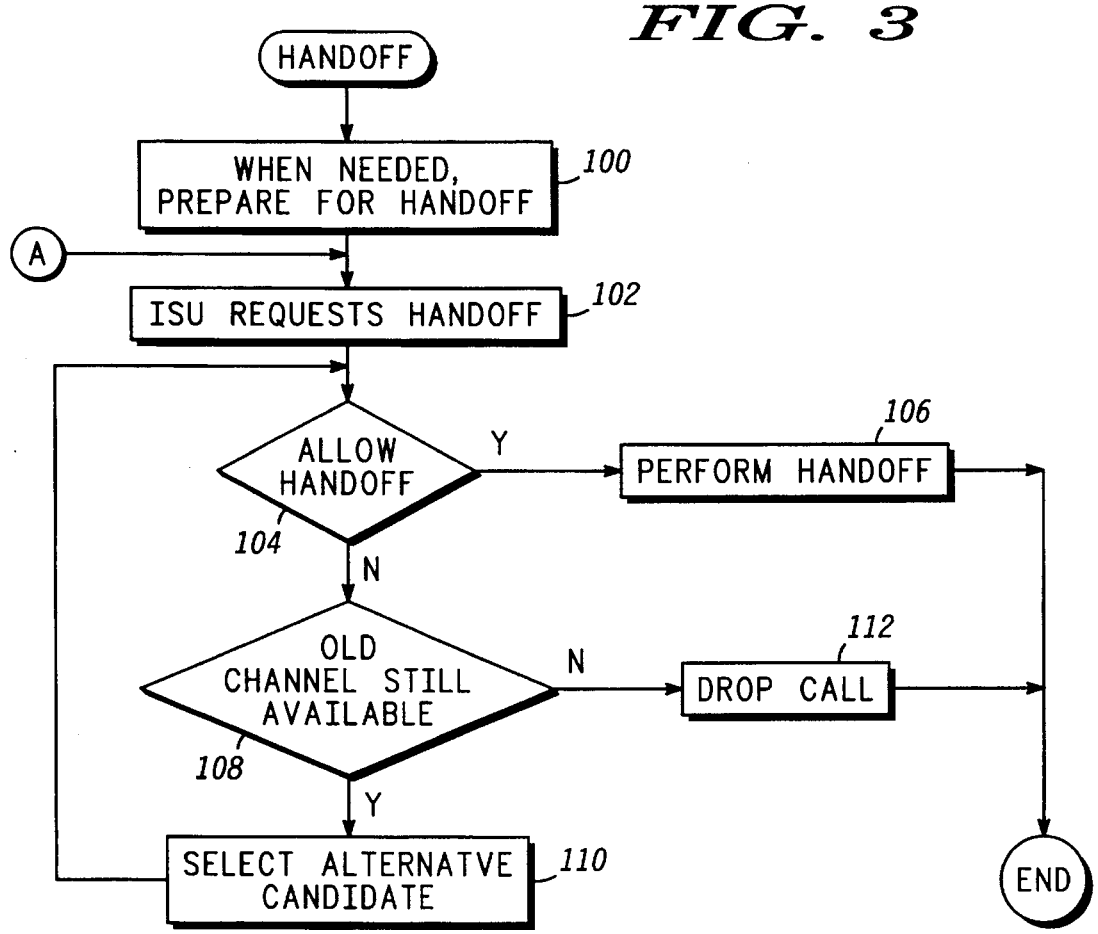
FIG. 3 shows a high-level handoff procedure for handing-off communications from one cell to another cell in accordance with a preferred embodiment of the invention.

FIG. 3 shows a flowchart of a handoff procedure for handing-off calls or communications from one cell to another cell in accordance with a preferred embodiment of the invention. The FIG. 3 handoff procedure is used for handing-off calls or communications from one cell of one satellite to another cell of the same satellite (inter-cell handoff) and for handing-off communications from one cell of a first satellite to another cell of a second satellite (inter-satellite handoff).

According to FIG. 3, an ISU (individual subscriber unit) and a satellite servicing the ISU prepare in step 100 for handoff. This step 100 may include other steps such as determining whether handoff is to occur and selecting a candidate cell for handing-off communication. The communication system allows various classes of ISU's to use different methods for determining the need for handoff. The baseline for a voice ISU is differential power. Other methods may use location of the ISU on the Earth and combined power and Doppler shift. Basically, any technique that can be performed independently by the ISU can be used.

In step 102 of FIG. 3, the ISU requests that the satellite presently servicing the ISU to handoff communication from the current cell to a candidate cell. When handoff occurs between two cells served by the same satellite, control information is passed between the ISU and the satellite without interruption of mission traffic and no requirement for network involvement. Handoff between cells on different satellites may require a short interruption of mission traffic. When conditions permit, voice detection allows handoffs of this type to occur during periods of no voice activity.

After the handoff request is received by the satellite in step 102, the satellite determines in step 104 whether the handoff request will be accepted. If handoff is permitted, the satellite performs in step 106 the inter-cell or inter-satellite handoff. A handoff will generally involve a change in the subscriber radio link channel assignment. This requires the ISU to resynchronize to the new traffic channel assignment.

If the request is denied in step 104, the satellite informs the ISU which determines in step 108 whether the old channel is still available. If the old traffic channel is still available, the ISU selects an alternative candidate cell in step 110 and returns to step 104 to determine whether the satellite will permit handoff to the alternative candidate cell. This continues until the handoff request is accepted and the handoff is performed, or until the channel in the original cell can no longer be maintained and the call is dropped in step 112. If the satellite does not handoff communication to the candidate cell before the ISU leaves the current cell, the ISU's communication will be terminated and the call dropped. Dropping a call in step 112 may be either intentional (the call being disconnected before the satellite is out of range) or unintentional (the call being disconnected because the satellite goes out of range of the ISU).

Each time a new traffic channel is assigned, the satellite provides the ISU with a prioritized list of candidate cells for the next handoff. The choice of candidate cells depends on the current cell in which the ISU is located and current cell shutdown dynamics. Although this method is compatible with a geolocation based handoff process, it does not require geolocation beyond the simple knowledge of which cell the ISU is in. Thus, the method accommodates whatever location accuracy the system is going to generate.

Figure 4:
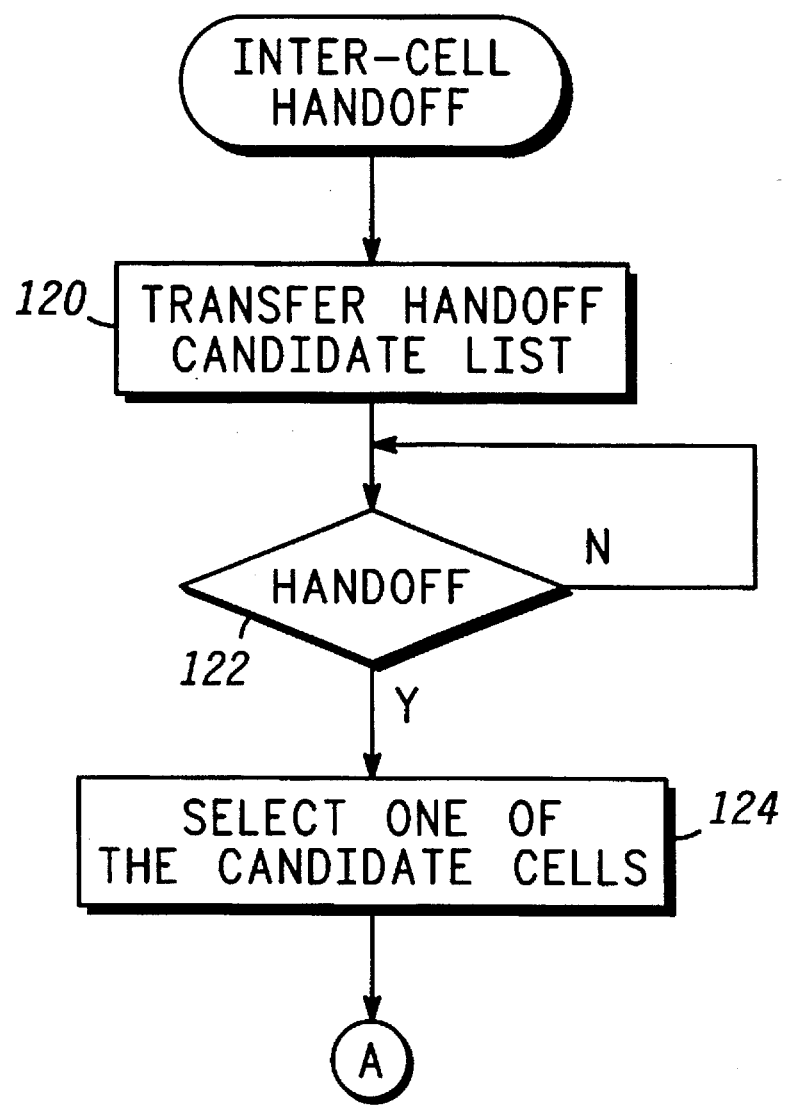
FIG. 4 shows a flowchart of an inter-cell handoff method in accordance with a preferred embodiment of the invention.

FIG. 4 shows a flowchart of the inter-cell handoff method in accordance with a preferred embodiment of the invention. Inter-cell handoff occurs when an ISU transitions from a current traffic channel in one cell to a new traffic channel in another cell as a satellite and its corresponding cells pass by. In the preferred embodiment, the inter-cell handoff occurs approximately every 60 seconds during a telephone call. Moreover, it takes approximately six seconds from the time an ISU initially acquires a traffic channel in one cell until the time that it must be prepared to complete handoff of the communications to another traffic channel in another cell.

In step 120 of FIG. 4, the ISU and satellite servicing the ISU prepare for handoff from one cell to another cell of the same satellite. The cells are projected in this case by one satellite. As shown in FIG. 4, a handoff candidate list is transmitted in step 120 from the satellite to the ISU. The handoff candidate list comprises channel identification (time and frequency) for the broadcast channels of the two or three cells that are the most likely candidate cells into which the ISU will be transferred during the next handoff. The handoff candidate list will be prioritized based on the length of time the cell is available for handoff.

The handoff candidate list includes only cells that are suitable candidates for handoff. In particular, cells will not be included if they are about to be shut down, even if the current geometry would seem to make them a good candidate for handoffs from the current cell. When the satellites approach either of the poles, candidate cells of the satellites may begin to overlap. This means that one of the satellites will have to turn off its cells and corresponding channels so that no interference will be caused between two active, overlapping cells. Moreover, the calls will be transferred from the satellites whose cells are being turned off to the satellite whose cells remain turned on.

The handoff candidate list is generated in advance by satellite control station (SCS) 28 shown in FIG. 1. SCS 28, by knowing the current geometric relationship between cells and the cell shut down plan, predicts to what candidate cells the ISU's currently in a particular cell can transfer their communication. SCS 28 transfers the time-sequenced handoff candidate list for each cell served by a satellite to each of the satellites which in turn transmits the appropriate list to the ISU's in each of its cells. The ISU's update their candidate list by observing differences between the broadcast channels identified in the handoff candidate update messages and the broadcast channels transmitted in previously provided candidates lists. Whether or not a channel in the current list remains valid is indicated by the current satellite in the candidate update messages.

The handoff candidate list is relatively static for cells near the center of the satellite footprint. For cells near the edge of the satellite footprint, the handoff candidate list may be relatively dynamic. For cells near the counter-rotating seam (area where satellites traveling in two different directions pass each other), the handoff candidate list is very dynamic.

Returning to the flowchart shown in FIG. 4, the ISU determines in step 112 whether a handoff from the current cell to one of the candidate cells should occur. Handoff may be initiated by an ISU when one of two actions occur. First, a handoff may be initiated by an ISU when it detects that one of the candidate cells is likely to offer a better quality of service than the current cell. The sampling process by which the ISU measures the quality of the current cell and the candidate cells and the precise decision process is left to the ISU developer. One acceptable procedure, however, is to compare the signal strength in the current cell with the candidate cells and request handoff when one of the candidate cells exceeds the current cell for a sufficient period of time.

A second acceptable method is for initiation of handoff to occur when the ISU detects that it is approaching the edge of the cell. The ISU detects this by determining its position relative to the edge of the current cell and determining how long before the edge of the current cell is reached. The ISU will transition to a new channel in another cell when enough time exists before losing communication with the satellite through the current channel. Other technologies for determining that a handoff should be initiated will occur to those skilled in the art.

According to FIG. 4, if handoff is not to occur in step 122, the ISU will continue to monitor the signal quality and/or positioning conditions until a handoff is required. Step 122 is essentially a wait step with constant monitoring of the relative conditions between the current cells and the candidate cells. When the handoff measurement process meets the predetermined criteria, the ISU selects in step 124 one of the candidate cells that will receive the handoff from the current cell.

The selection of the chosen candidate cell will be based by the priority assigned to each candidate cell. The specific decision criteria used will be implementation dependent. For example, the baseline design is a threshold test for the difference between the power in the broadcast signals in the candidate cells and the current cell. The process may be statistically optimized to separate antenna pattern variations from channel effects. The threshold(s) will be chosen so that candidate cells are preferentially selected based on the priority they were assigned by SCS 28. If one or more candidate cell differential powers happen to meet the criteria at the same time, the ISU will request the candidate cell with the highest priority.

Once the candidate cell is selected in step 124 of FIG. 4, the process returns to step 102 of FIG. 3 wherein the ISU transmits a handoff request to the satellite. The handoff request includes the candidate cell (i.e., the cell that the ISU wants to transfer its communication). When the satellite receives the handoff request from the ISU, it first determines if it also services the requested candidate cell. In inter-cell handoff, the requested candidate cell is serviced by the satellite. The satellite places the new uplink and downlink traffic channel assignment into a control field of the next downlink burst to the requesting ISU. When the ISU receives the new assignment, it waits until it has received all of the downlink burst and has sent the corresponding uplink burst. The ISU then tunes to the new traffic channel. Next, the satellite directs the traffic for the requesting ISU to the new channel. (Since both the old and new channels are on the same satellite, the Doppler and timing offsets are the same for both cells at the time of the handoff and the ISU can synchronize immediately.) Following the handoff, the ISU discards its current handoff candidate list and the satellite provides a handoff candidate list for the new cell.

Figure 5:
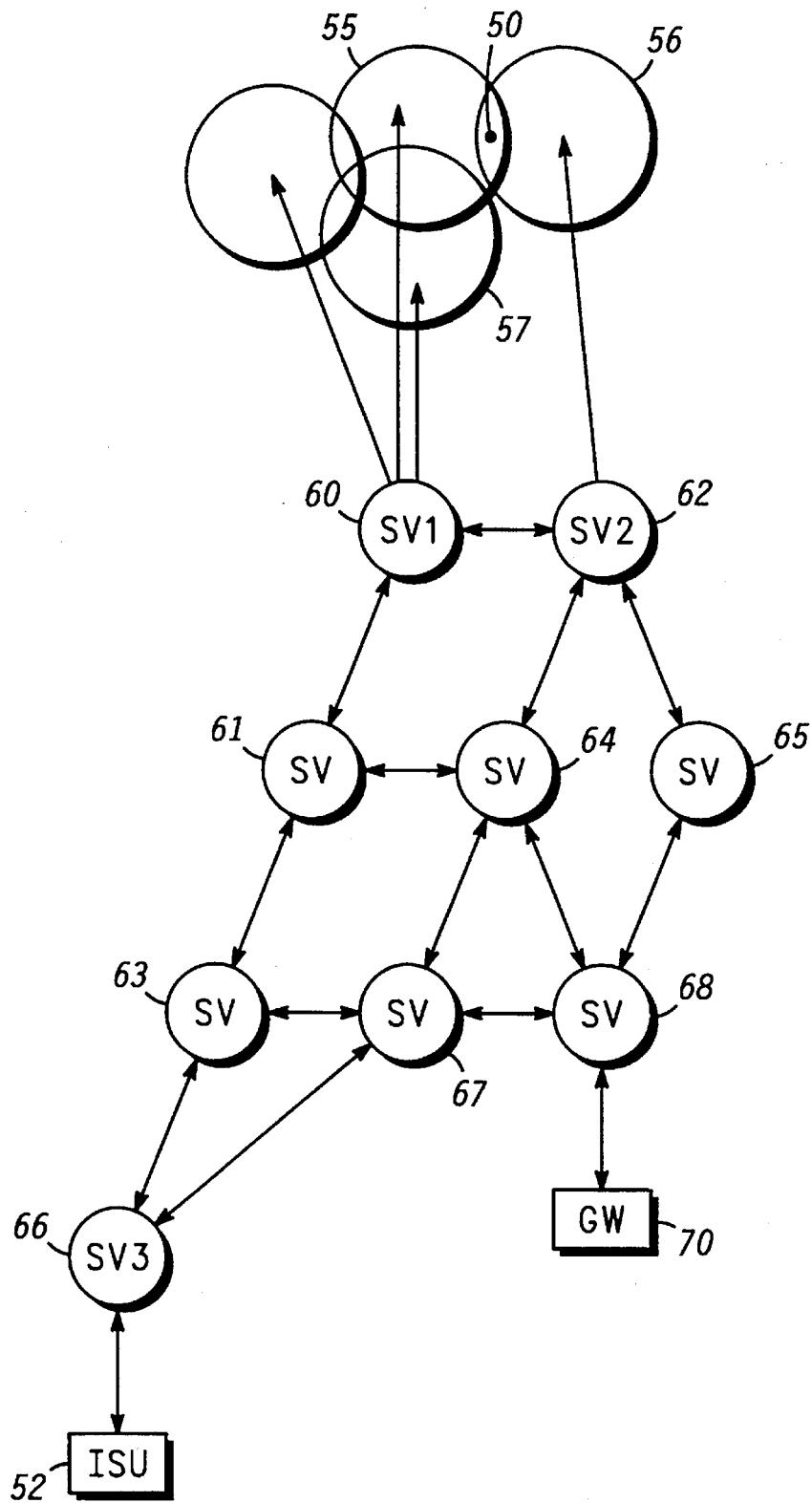
FIG. 5 shows a small portion of a constellation of satellites connected by communication links for handing-off a call from a current cell of a first satellite to a second cell of a second satellite in accordance with a preferred embodiment of the invention.

FIG. 5 shows an example of a satellite system configuration for handing-off a call or communication for ISU 50 from cell 55 of satellite 60 to cell 56 of satellite 62 in accordance with a preferred embodiment of the invention. As shown in FIG. 5, ISU 50 is communicating with ISU 52 through the network of satellites 60–68. Satellites 60–68 (shown as SV or space vehicles) are connected together in a web-like fashion.

Satellite 60 (which is also SV1) provides the means for ISU 50 to communicate with the network of satellites 60–68 in order to talk to ISU 51. ISU 50 is presently in cell 55 which is projected by SV1 60. However, cell 55 is moving away from ISU 50 while cell 56 which is projected by satellite 62 (which is also shown as SV2) is moving toward ISU 50. The communication of ISU 50 needs to transfer from cell 55 to cell 56 or the call will be dropped when ISU 50 exits the boundaries or the range of communication of cell 55. This process of passing communication from the current cell 55 of SV1 60 to a candidate cell 56 of SV2 62 is what is known as inter-satellite handoff.

ISU 52 is being serviced by satellite 66 (or shown as SV3) for communicating with ISU 50 across the network of satellites 60–68. Routing the call from SV1 60 to SV3 66 and visa versa may take a variety of directions. For example, the call may be routed from SV1 60 to SV 61, to SV 63 and then to SV3 66. The call could also be routed from SV1 60 to SV 61, to SV 64, to SV 67 and then to SV3 66. This may occur because SV 63 has failed or reached maximum capacity of the number of calls it can service.

Gateway (GW) 70 is responsible for routing the calls from one dialing ISU 50 to the receiving ISU 52. GW 70 communicates with the network of satellites through SV 68.

FIG. 6 shows a flowchart for an inter-satellite handoff method in accordance with a preferred embodiment of the invention. The flowchart shown in FIG. 6 is used when the current satellite sets and a new satellite comes into view. In other words, ISU 50 must transfer its communications to the new satellite or the call will be dropped. This process is called inter-satellite handoff and occurs on the average, approximately every five minutes during a telephone call.

The flowchart in FIG. 6 details the method of handing-off a call of ISU 50 from a current cell 55 of a first satellite ("SV1") 60 to a candidate cell 56 of a second satellite ("SV2") 62 in a satellite cellular communication system as shown in FIG. 5. SV1 60 and SV2 62 project respectively the current cell 55 and candidate cell 56 onto the Earth. ISU 52 communicates with ISU 50 through a third satellite ("SV3") 66.

According to FIG. 6, the inter-satellite handoff method commences with ISU 50 requesting in step 200 a channel in candidate cell 56 of SV2 62. This step also involves the steps of transferring a handoff candidate list from SV1 60 to ISU 50, determining whether a handoff is to occur and selecting one of the candidate cells to receive the handoff. These steps are similar to steps 120, 122 and 124 shown in FIG. 4. However, instead of choosing another cell within the same satellite, such as cell 57 projected by SV1 60 shown in FIG. 5, for example, ISU 50 chooses candidate cell 56 within a different satellite (SV2 62). As described above, choosing one of the cells is based on a variety of factors including channel availability and capacity information as indicated by the handoff candidate list and local channel quality determined by the ISU.

Once ISU 50 determines in step 200 what candidate cell it wants to transfer its communication to, ISU 50 sends a handoff request to SV1 60 which forwards it in step 202 to GW (gateway) 70. Forwarding the handoff request involves transmitting the handoff request through the network of satellites 60–68 so that it reaches satellite 68 which is connected to GW 70. After GW 70 receives the handoff request, GW 70 sends in step 204 a channel request to SV2 62 to reserve a traffic channel in cell 56 of SV2 62. It also sends an interlock command to SV3 66 to prevent handing off both ends of a call at the same time.

In step 206, SV2 62 determines whether to accept or deny the traffic channel request. If SV2 62 denies the traffic channel request, SV2 62 sends a denial message to GW 70 in step 208. GW 70 forwards in step 210 the denial to SV1 60 which is transmitted to ISU 50. If ISU 50 has enough time to select another candidate cell before the call is dropped in step 212, ISU 50 returns to step 200 to select and request another candidate cell from the handoff candidate list. Otherwise, the call is dropped and the inter-satellite method ends.

If SV2 62 accepts the traffic channel request in step 206 of FIG. 6, SV2 62 reserves in step 213 a traffic channel in cell 56 and sends in step 214 control information to GW 70. The control information that is sent includes the channel identification (ID) for the reserved channel. In the preferred embodiment, the channel ID includes the TDMA time slot and the FDMA carrier frequency or frequencies of the reserved channel. Once GW 70 receives the control information, GW 70 determines a new route for transmitting the call from SV3 66 to SV2 62. This determination results in routing instructions which are forwarded in step 216 along with the control information from GW 70 to SV3 66.

Once SV3 66 receives the control information, SV3 66 sends or relays in step 218 the control information to SV1 60 using the same route that has been carrying the call traffic. Using this route ensures that any communication from SV3 66 to SV1 60 is received before SV3 66 transfers the call. After sending the control information, SV3 66 begins in step 220 to route the call (and its corresponding data packets) to SV2 62. The routing instructions provided by GW 70 dictate through which of the satellites 60–68 the call will be directed.

After SV1 60 receives the control information, SV1 60 sends in step 222 the handoff command to ISU 50. The handoff command permits ISU 50 to begin synchronizing in step 224 to the traffic channel of selected candidate cell 56 of SV2 62 and to drop communication with current traffic channel of cell 56 of SV1 60. Following a satellite-to-satellite handoff, ISU 50 discards the current handoff candidate list and a new candidate handoff list is provided by SV2 62 which is now servicing ISU 50.

Those skilled in the art will note that if an ISU developer chooses to add an additional level of complexity (e.g., a second receiver channel), the ISU may begin to synchronize to SV2 62 by monitoring the broadcast channel of the candidate cell as soon as it sends the handoff request to SV1 60 while simultaneously maintaining communication over its assigned channel in the original cell on SV1 60.

In some cases, SV3 66 will be communicating the call data to a PSTN through a gateway instead of communicating with an ISU. The gateway may be the controlling gateway 70 or another gateway in the system. In this case, the inter-satellite process remains essentially the same, except the handoff interlock at SV3 66 is not invoked.

Those skilled in the art will recognize that nothing requires that the handoff control functions be performed in a gateway. They could, for example, be performed in SCS 28 or in any one or a combination of satellites 12 (of FIG. 1).

It will be appreciated by those skilled in the art that the present invention performs inter-cell handoff and inter-satellite handoff based upon current conditions and a dynamic handoff candidate list rather than a predetermined sequence of handoffs as in the prior art. It is an advantage of the present invention to handoff communication from one cell to another cell of the same satellite and to handoff communication from one cell of one satellite to another cell of a different satellite. Yet another advantage of the present invention is a handoff method which does not unduly complicate the system hardware.

Another advantage of the present invention is to handoff a call from cell to cell without interrupting service. It is also an advantage of the present invention that the ISU establishes the need for handoff and the selects the choice of a candidate cell based on current local conditions.

Yet another advantage of the present invention is to allow various classes of ISU's to use different methods for determining the need for handoff. Another advantage of the present invention is to generate a dynamic handoff candidate list from which a candidate cell is selected.

Accordingly, it is intended by the appended claims to cover all modifications of the invention which fall within the true spirit and scope of the invention.

What is claimed is:

1. A method of handing-off a call of an individual subscriber unit (ISU) from a current cell to one of a plurality of candidate cells in a satellite cellular communication system, a satellite projecting the current cell and the candidate cells onto Earth, the method comprising the steps of:

(a) transferring a handoff candidate list comprising a list of candidate cells from the satellite to the ISU;

(b) the ISU determining whether the handoff is to occur;

(c) the ISU selecting one of the candidate cells to receive the handoff based on the handoff candidate list;

(d) the ISU requesting the handoff from the current cell to the candidate cell; and (e) the satellite performing the handoff from the current cell to the candidate cell.

2. A method as recited in claim 1, wherein the handoff candidate list comprises a list of available candidate cells.

3. A method as recited in claim 1, wherein step (a) further comprises the step of the ISU selecting one of the candidate cells to receive the handoff from the current cell based on whether the candidate cell is likely to offer a better quality of service than the current cell and whether the candidate cell is available and causes no interference.

4. A method as recited in claim 1, wherein step (a) comprises the steps of:

(a1) determining a position of the ISU relative to an edge of the current cell;

(a2) determining how long before the edge of the current cell is reached; and (a3) selecting one of the candidate cells based on availability and whether the available candidate cell will cause any interference.

5. A method as recited in claim 4, wherein step (d) comprises the step of the ISU requesting the satellite to make the handoff to the available, non-interfering candidate cell selected in step (c).

6. A method as recited in claim 1, wherein step (e) comprises the steps of:

(e1) the satellite denying the request from the ISU to make the handoff to the selected candidate cell;

(e2) the ISU selecting an alternative cell if the current cell is still available;

(e3) dropping the call if the current cell is not available.

7. A method of handing-off a call of an individual subscriber unit (ISU) from a current cell to one of a plurality of candidate cells in a satellite cellular communication system, a satellite projecting the current and the candidate cells onto Earth, the method comprising the steps of:

(a) transferring a handoff candidate list comprising the plurality of candidate cells from the satellite to the ISU;

(b) the ISU determining whether a handoff is to occur;

(c) the ISU selecting what candidate cell will receive the handoff based on the handoff candidate list;

(d) the ISU requesting the satellite to make the handoff to the selected candidate cell;

(e) the satellite determining whether the handoff from the current cell to the selected candidate cell should occur;

(f) the satellite performing the handoff request from the current cell to the selected candidate cell if request can be performed;

(g) the satellite denying the handoff request from the current cell to the selected candidate cell if the request cannot be performed;

(h) the ISU selecting an alternative cell;

(i) the ISU requesting the alternative cell;

(j) repeating steps (e)–(i) until the handoff occurs or the call drops.

8. A method as recited in claim 7, wherein step (b) comprises the steps of:

(b1) determining a position of the ISU relative to an edge of the current cell;

(b2) determining how long before the edge of the current cell is reached; and (b3) selecting one of the candidate cells based on availability and whether the candidate cell will cause the least amount of interference.

9. A method as recited in claim 7, wherein step (c) comprises the step of the ISU determining what candidate cell to make the handoff based on local conditions and the list of the candidate cells contained in the handoff candidate list.

10. A method of handing-off a call of a first individual subscriber unit (ISU) from a current cell of a first satellite to a candidate cell of a second satellite in a satellite cellular communication system, the first satellite projecting the current cell onto Earth, a plurality of second satellites each projecting a candidate cell onto Earth, a second ISU communicating with the first ISU through a third satellite, the method comprising the steps of:

(a) the first ISU making a channel request;

(b) the first satellite forwarding the channel request to a gateway;

(c) the gateway sending an interlock command to the third satellite;

(d) the gateway relaying the channel request to the second satellite;

(e) the second satellite sending control information to the gateway;

(f) the gateway forwarding the control information and routing instructions to the third satellite;

(g) the third satellite relaying the control information to the first satellite;

(h) the third satellite routing the call to the second satellite;

(i) the first satellite receiving the control information;

(j) the first satellite sending a handoff order to the first ISU; and (k) the first ISU synchronizing with the candidate cell of the second satellite.

11. A method as recited in claim 10, wherein step (a) comprises the steps of:

(a1) transferring a handoff candidate list comprising a list of the candidate cells from the first satellite to the first ISU;

(a2) the first ISU determining whether a handoff is to occur; and (a3) the first ISU selecting one of the candidate cells to receive the handoff based on the handoff candidate list.

12. A method as recited in claim 11, wherein the handoff candidate list comprises a list of available candidate cells.

13. A method as recited in claim 11, wherein step (c) comprises the step of the first ISU selecting one of the candidate cells to receive the handoff from the current cell based on local conditions and whether the one of the candidate cells is available.

14. A method as recite claim 10, wherein step (e) comprises the steps of:

(e1) the second satellite determining whether to accept the channel request; and (e2) the second satellite reserving a channel in the one of candidate cells.

15. A method as recited in claim 14, wherein step (e) further comprises the steps of:

(e3) the second satellite denying the channel request;

(e4) the first ISU selecting another channel; and (e5) repeating steps (e3) and (e4) until either the call is dropped or the second satellite reserves the channel.

16. A method as recited in claim 10, wherein step (e) comprises the steps of:

(e1) the second satellites reserving the channel based on the channel request; and (e2) the second satellites sending a channel ID to the gateway.

17. A method as recited in claim 10, wherein each call comprises a plurality of packets, and wherein step (h) comprises the step of the third satellite routing new packets of the call to the second satellite.

18. A method as recited in claim 10, wherein each call comprises a plurality of packets, and wherein step (i) comprises the step of the first satellite receiving a channel ID after receiving all prior packets of the call sent from the third satellite.

19. A method as recited in claim 10, wherein step (k) comprises the steps of:

(k1) the first ISU synchronizing with a channel of the second satellite; and (k2) receiving the call from the second satellite.

20. A method as recited in claim 10, wherein step (k) comprises the steps of:

(k1) the first ISU synchronizing with a channel of the second satellite while still receiving the call from the current cell; and (k2) the first ISU receiving the call from the second satellite after synchronization is completed.

21. A method of handing-off a call of a first individual subscriber unit (ISU) from a current cell of a first satellite to a candidate cell of other satellites in a satellite cellular communication system, the first satellite and the other satellites respectively projecting the current and candidate cells onto Earth, a second ISU communicating with the first ISU through a third satellite, the method comprising the steps of:

(a) the first ISU making a request for a channel in a candidate cell of a second satellite;

(b) the first satellite forwarding the request to a gateway;

(c) the gateway sending an interlock command to the third satellite;

(d) the gateway sending the channel request to the second satellite;

(e) the second satellite reserving the channel and sending a channel ID to the gateway;

(f) the gateway forwarding the channel ID and routing instructions to the third satellite;

(g) the third satellite relaying the channel ID to the first satellite;

(h) the third satellite routing new packets of the call to the second satellite;

(i) the first satellite receiving the channel ID after receiving all prior packets sent from the third satellite;

(j) the first satellite sending a handoff order to the ISU; and (k) the ISU synchronizing with the channel of the second satellite.

22. A method as recited in claim 21, wherein step (k) comprises the steps of:

(k1) the first ISU synchronizing with a channel of the second satellite while still receiving the call from the current cell; and (k2) the first ISU receiving the call from the second satellite after synchronization is completed.

23. A method executed by an individual subscriber unit (ISU) for handing-off a call of the ISU from a current cell to one of a plurality of candidate cells in a satellite cellular communication system, a satellite projecting the current cell and the candidate cells onto Earth, the method comprising the steps of:

(a) receiving a handoff candidate list comprising a list of candidate cells from the satellite;

(b) determining whether the handoff is to occur;

(c) selecting one of the candidate cells to receive the handoff based on the handoff candidate list;

(d) requesting the handoff from the current cell to the candidate cell; and (e) waiting for the satellite to perform the handoff from the current cell to the candidate cell.

24. A method executed by a satellite for handing-off a call of an individual subscriber unit (ISU) from a current cell to one of a plurality of candidate cells in a satellite cellular communication system, the satellite projecting the current cell and the candidate cells onto Earth, the method comprising the steps of:

(a) transmitting a handoff candidate list comprising a list of candidate cells to the ISU;

(b) waiting for the ISU to determine whether the handoff is to occur and to select one of the candidate cells to receive the handoff based on the handoff candidate list;

(c) receiving from the ISU a handoff request from the current cell to the candidate cell; and (d) performing the handoff from the current cell to the candidate cell.

25. A method executed by an individual subscriber unit (ISU) for handing-off a call of the ISU from a current cell to one of a plurality of candidate cells in a satellite cellular communication system, a satellite projecting the current and the candidate cells onto Earth, the method comprising the steps of:

(a) receiving a handoff candidate list comprising the plurality of candidate cells from the satellite;

(b) determining whether a handoff is to occur;

(c) selecting what candidate cell will receive the handoff based on the handoff candidate list;

(d) requesting the satellite to make the handoff to the selected candidate cell;

(e) waiting for the satellite to perform the handoff from the current cell to the selected candidate cell if the request can be performed;

(f) receiving from the satellite a refusal to perform the handoff from the current cell to the selected candidate cell if the request cannot be performed;

(g) selecting an alternative cell if the refusal was received;

(h) requesting the alternative cell if the refusal was received;

(i) waiting for the satellite to perform the handoff from the current cell to the selected alternative cell if request can be performed;

(j) receiving from the satellite the refusal to perform the handoff from the current cell to the selected alternative candidate cell if the request cannot be performed; and (k) repeating steps (g)–(j) until the handoff occurs or the call is dropped.

26. A method of handing-off a call of a first individual subscriber unit (ISU) from a current cell of a first satellite to a candidate cell of a second satellite in a satellite cellular communication system, the first satellite projecting the current cell onto Earth, a plurality of second satellites each projecting a candidate cell onto Earth, a second ISU communicating with the first ISU through a third satellite, the method comprising the steps of:

(a) the first satellite receiving a channel request from the first ISU (b) the first satellite forwarding the channel request to a gateway;

(c) the third satellite receiving an interlock command from the gateway;

(d) the second satellite receiving the channel request from the gateway;

(e) the second satellite sending control information to the gateway;

(f) the third satellite receiving the control information and routing instructions from the gateway;

(g) the third satellite relaying the control information to the first satellite;

(h) the third satellite routing the call to the second satellite;

(i) the first satellite receiving the control information;

(j) the first satellite sending a handoff order to the first ISU; and (k) the second satellite synchronizing with the first ISU.

27. A method executed by a first individual subscriber unit for handing-off a call of the ISU from a current cell of a first satellite to a candidate cell of a second satellite in a satellite cellular communication system, the first satellite projecting the current cell onto Earth, a plurality of second satellites each projecting a candidate cell onto Earth, a second ISU communicating with the ISU through a third satellite, the method comprising the steps of:

(a) receiving a handoff candidate list comprising a list of candidate cells from the first satellite;

(b) determining whether the handoff is to occur;

(c) selecting the candidate cell to receive the handoff based on the handoff candidate list;

(d) requesting the handoff from the current cell to the candidate cell of the second satellite; and (e) waiting for the handoff to be performed from the current cell to the candidate cell of the second satellite.

* * * * *